(12) United States Patent
Costa

(10) Patent No.: US 6,261,398 B1
(45) Date of Patent: Jul. 17, 2001

(54) PROCESS FOR PRODUCING A CURVED LAMINATED SAFETY GLASS SHEET

(75) Inventor: Peter Costa, Witten (DE)

(73) Assignee: Pilkington Automotive Deutschland GmbH, Witten (DE)

(*) Notice: Subject to any disclaimer, the term of this patent is extended or adjusted under 35 U.S.C. 154(b) by 0 days.

(21) Appl. No.: 09/381,558
(22) PCT Filed: Mar. 7, 1998
(86) PCT No.: PCT/EP98/01347
§ 371 Date: Sep. 17, 1999
§ 102(e) Date: Sep. 17, 1999
(87) PCT Pub. No.: WO98/41396
PCT Pub. Date: Sep. 24, 1998

(30) Foreign Application Priority Data

Mar. 19, 1997 (DE) ............................................. 197 11 459

(51) Int. Cl.[7] ............................. B32B 31/20; B32B 17/00
(52) U.S. Cl. ......................... 156/102; 156/103; 156/104; 156/106; 156/286
(58) Field of Search ......................... 156/99, 102, 103, 156/104, 106, 212, 286

(56) References Cited

U.S. PATENT DOCUMENTS

| | | | |
|---|---|---|---|
| 4,465,736 | * 8/1984 | Nishihara et al. | 156/106 |
| 5,069,734 | * 12/1991 | Kavanagh et al. | 156/84 |
| 5,264,058 | * 11/1993 | Hoagland et al. | 156/99 |
| 5,529,654 | * 6/1996 | Kavanagh et al. | 156/229 |
| 5,631,089 | * 5/1997 | Center, Jr. et al. | 156/99 |

FOREIGN PATENT DOCUMENTS

| | | |
|---|---|---|
| 195 34 420 A1 | 3/1997 | (DE) . |
| 60193638 | 10/1985 | (JP) . |

* cited by examiner

Primary Examiner—Michael W. Ball
Assistant Examiner—John T. Haran
(74) Attorney, Agent, or Firm—Herbert Dubno

(57) ABSTRACT

This invention concerns a process for producing a curved, laminated safety glass sheet from a first curved glass sheet (1), a first laminated layer (2), a thermoplastic substrate sheet (4) with a biaxially drawn thin-layer system (3), a second laminated layer (5), and a second curved glass sheet (10) conforming to the first one. To avoid formation of folds in the substrate layer, the process has the following steps: (a) a prelaminated sheet consisting of the first laminated layer (2) and the substrate sheet (4) is superimposed with its laminated layer facing the first glass sheet, (b) a bend-resistant cover sheet (10) conforming to the first glass sheet (1) is superimposed on the prelaminated sheet, (c) the glass layer packet formed out of the first glass sheet (1) and the prelaminated sheet with the cover sheet (10) superimposed upon it is preliminarily bonded by removing the air and subjecting it to pressure and heat, (d) the cover sheet (10) is removed, (e) the second laminated layer (5) and the second glass sheet (10) are superimposed on the preliminarily bonded glass-film pocket, (f) the laminate so formed is preliminarily bonded by removing the air and subjecting it to pressure and heat, (g) the preliminarily bonded laminate is finally bonded into a laminated safety glass sheet by subjecting it to pressure and heat.

13 Claims, 3 Drawing Sheets

PROCESS FOR PRODUCING A CURVED LAMINATED SAFETY GLASS SHEET

CROSS REFERENCE TO RELATED APPLICATION

This application is a national phase of PCT/EP98/01347 filed Mar. 7, 1998 and based upon German National Application 1 9711 459.8 of Mar. 19, 1997 under the International Convention.

FIELD OF THE INVENTION

The present invention relates to a process for producing a bent laminated safety glass sheet or pane from a first curved glass sheet, a first bonding layer, a thermoplastic carrier foil provided with a thin layer system, a second bonding layer as well as a second bent glass sheet conforming to the first bent glass sheet.

BACKGROUND OF THE INVENTION

Laminated safety glass sheets of the aforedescribed construction are increasingly used as sunscreens, especially for motor vehicles. For this purpose, the thin layer system on the carrier foil typically consists of up to three noble metal layers, preferably of a silver basis, which are embedded in dielectric layers (U.S. Pat. No. 4,799,745). Through the use of a thermoplastic foil as a carrier system, it can be insured that the carrier foil can match the curvature the glass sheets in the course of the heat treatment required for bonding them together. The matching deformation of the carrier foil is supported in that biaxially stretched thermo-plastic carrier foils are used. In connection with the selection of suitable carrier foils reference may be had to, for example, EP 0 077 672 B2 and EP 0 457 209 A2. Especially well suited for bent laminated safety glass sheets are the biaxially stretched carrier foils which are the subject of the older PCT application EP 96-04018 (WO97/10099, Flachglas Automotive GmbH). The two laminate layers serve for adhesive bonding of the carrier foil with the glass sheets and impart safety glass characteristics to the laminate.

For the production of laminated safety glass sheets of the afore-described construction, it has already been proposed to provide a foil prelaminate from the first bonding layer, the carrier foil provided with the thin layer system and the second bonding layer, in which the foils are pressed together, degassed and are prebonded with the use of heat (EP 0 535 128 B1). The thus formed foil laminate with air evacuated from between layers is laid between the two glass sheets, whereupon the laminate of the glass sheets and prefoil laminate is subjected to a degassing process as well as to a prebonding process. Finally, the laminate is finish bonded at increased temperature and higher pressure to the laminated safety glass. This process has been found to be suitable for slightly curved glass sheets. With greater bends, especially complex bends, when this process is carried out in practice, there can be wrinkle formations above all in the edge regions in the carrier foil which have been termed edge corrugations. To overcome this problem various approaches have already been proposed in which a prelamination of at least one bonding layer and the carrier foil is suitably preformed in a special apparatus (WO 94/04 357). Such a process is expensive and requires for each sheet type, a specially prefabricated form.

Tolerance-caused deviation in the glass sheets from the intended shape can give rise in the previously known process, apart from matching defects which influence the optical characteristics of the finished laminated safety glass sheet, to bond defects between the glass sheets and the foil prelaminate.

OBJECTS OF THE INVENTION

It is an object of the invention basically, to provide an improved fabrication process for laminated safety glass sheets of the aforedescribed construction which is better able to avoid the development of wrinkles in the carrier foil during fabrication and which enables especially the production of complexly bent laminated safety glass sheets without wrinkle formation especially in the sight regions of the sheet. Another object is to make bonded laminated safety glass sheets which, to the greatest possible extent are free from such undesired deformations as have in the past caused the optical defects which have their origins in the carrier foil provided with the thin layer system, above all in reflected as well as in transmitted light.

SUMMARY OF THE INVENTION

A process for producing a bent laminated safety glass pane from a first bent glass sheet, a first bonding layer, a thermoplastic carrier foil provided with a thin layer system, a second bonding layer as well as a second bent glass sheet matching the first bent sheet can be made by the following sequence of steps:

(a) a foil prelaminate, comprised of the first bonding layer and the carrier foil are placed with the bonding layer side against the first glass sheet, (b) a cover sheet, bent to match the first glass sheet, is placed on the foil prelaminate, (c) the glass-foil stack formed from the first glass sheet and the foil prelaminate is degassed and prebonded through the use of heat and pressure, (d) the cover sheet is removed, (e) the second bonding layer and the second glass sheet are applied to the prebonded glass-foil stack, (f) the thus formed laminate is degassed and prebonded with the use of heat and pressure, and (g) the prebonded laminate is finally bonded through the application of pressure and heat to a laminated safety glass pane.

The invention resides in the surprising discovery that with the aid of a multistage prebonding and final bonding process a cover sheet is applied to an initially prebonded prelaminate of a first bent glass sheet, a first bonding layer and a carrier foil, on the carrier foil to which the cover sheet is applied, before the second bonding layer and the second glass sheet initially prebonded with the prelaminate are provided and then the entire laminate is finally bonded so that detrimental wrinke formation of the carrier foil is avoided in a reliable manner. The invention is suitable most especially for the production of complexly bent motor vehicle laminated safety glass panes with a transverse bend of 10 mm or more. The transverse bend (height) which can be measured in the region of the transverse central axis as a standard, is normally the symmetry axis for windshields or rear vehicle windows.

It is indeed possible to work with bonding layers formed in situ from bonding materials applied in a flowable state to one of the glass sheets or the carrier foils, for example, with cast resins or with bonding materials which are solubilized in suitable solvents and brought into a liquid state. The bonding layers coming within the realm of the invention however are preferably bonding foils which are preferably rendered grainy superficially and are of the usual thicknesses, i.e. typically 0.38 or 0.76 mm as are known for use as materials in laminated glass production.

The carrier foils used preferably here are such as those described in PCT application EP 96/04018. The invention is not however, limited to them. The criteria for the material and thickness selection for a carrier foil in combination with the present invention are its compatibility with the bonding layers and use in the prebonding and final bonding processes as well as its suitability from the point of view of thermal shrinkage characteristics such that a wrinkle-free matching deformation of the carrier foil can take place in the course of producing the laminated safety glass sheet. For this purpose, biaxially stretched carrier foils are basically indeed preferred. However, within the framework of the invention depending upon the curvature of the glass panes in individual cases, nonstretched carrier foils or carrier foils which have only been weakly stretched can be used. This can be the case especially when process step (c) is carried out at relatively high temperatures. The carrier foils must have sufficient light permeability for the respective purpose and must be suitable as carriers for the thin layer system and have good adhesion to the bonding layers on both sides.

Preferably, in accordance with the process of the invention, a foil prelaminate is used in which the thin layer system of the carrier foil adjoins the first bonding layer. The thin layer system is protected in this way against damage in the course of the fabrication process, especially during steps (b) and (e). For the production of the foil prelaminate, for example, the carrier foil can be withdrawn from a supply roll and with the use of heat and pressure with simultaneously or previous degassing, prebonded with the first bonding layer consisting of a bonded foil.

For the cover sheet which has stiffness against bending, basically any material which does not adhere to the carrier foil but which is compatible with the carrier foil of the foil prelaminate and has shape stability at the temperatures employed, can be used.

It will be self understood that the surface of the cover sheet which adjoins the carrier foil must be as smooth as possible. Preferably the cover sheet is comprised of glass or a glass-like material. In this manner, during the heat treatment of process step (c) approximately the same thermal conditions develop above and below the foil laminate. Basically it is possible to use one and the same glass pane a number of times as the cover sheet. It is of special advantage, however, when the second glass pane of the laminated safety glass sheet is used as the cover sheet for the process steps (b)–(d). Especially in that case, when—as is customary in the production of bent laminated safety glass panes—both glass sheets are bent in common, it is possible to effect the bending of the cover sheet and the first glass sheet in matching relationship such that the cover glass sheet during process step (c) completely closely bears against the carrier foil of the foil prelaminate and thus reliably prevents wrinkle formation.

Especially when process step (c) is carried out at relatively high temperatures it can be convenient to provide a thin separating layer for the cover sheet before it is laid upon the foil laminate, this thin separating layer being an adhesion reducing layer.

Alternatively, this thin separating layer can be arranged on the carrier foil of the foil prelaminate and preferably deposited with the latter on the first glass sheet together.

In either case, one must avoid point adhesions of the carrier foil to the cover layer which are so strong that in process steps (c) or (d), particles are torn out of the carrier foil and can give rise to optical effects in the finished laminated safety glass sheet. It has been found to be especially advantageous to provide the separating layer as a thin separating foil which is nonadherent to the carrier foil under the conditions of process step (c). As the separating foil, in the case of the carrier foils of PET which are preferably used in accordance with the invention, for example, foils of polyethylene (PE) or of uncoated PET as well as acetate foils have been found to be well suited. These materials are relatively economical with sufficient effectivity so that their use does not give rise to significant additional cost. The use of a foil as the separating layer has the advantage over powdered or liquid separate layers, moreover, of simple handling an application before and removal after the process step (c). It will be self understood that the separating layer (separating foil) must have a uniform thickness over the entire area so that during process step (c), the carrier foil will not be nonuniformly deformed.

The first and second bonding layers are preferably comprised of polyvinylbutyral (PVB) or ethylenevinylacetate copolymer (EVA). Especially for such bonding materials it is advantageous when the process step (c) is carried out at a pressure of at most 2.5 bar and a temperature which at least is about 10°, preferably at least about 50°, below the maximum temperature at which the final bonding according to process step (g) is carried out. When there is a corresponding selection of materials, it can be insured that the carrier foil of the foil prelaminate can slip along the cover sheet well and will not adhere pointwise thereto upon lifting of the cover sheet, the temperature of process step (c) being set preferably so that it is relatively close below the temperature of the final bonding according to process step (g) whereby the carrier foil will plastically deform and conform permanently to the curvature of the first glass sheet and the cover sheet. Since the thus generated conforming deformation of the carrier foil is fixed during the first prebonding process in which the foil prelaminate is prebonded with the first glass sheet, wrinkle formation during the remaining process steps is reduced to a minimum.

Surprisingly, with the fabrication process according to the invention, the so-called orange skin effect can be greatly reduced by comparison with conventional bonding processes. The orange skin effect which is above all visible in reflection, is the result of the rises in the bonding foil surfaces required for the degassing or release of trapped air from between the layers and which result in the course of the bonding process in the form of irregular rises and depressions in the carrier foil provided with the thin layer system. This undesirable effect is probably considerably reduced because the coated carrier foil during process step (c) is pressed against the smooth and nondeformable surface of the stiff cover sheet so that the rough venting surface of the adjacent first bonding layer is not transferred noticeably to the carrier foil so that laminated safety glass sheets as fabricated by the invention have hitherto unattainable reflection properties.

According to the invention, in all cases in which a biaxially stretched carrier foil is used, the temperatures for the prebonding heat treatment of process steps (c) and (f) should lie below the maximum temperature of final bonding according to process step (g) and indeed at least about 10° therebelow. In this manner it is possible to insure that the carrier foil even after the two prebonding heat treatments will retain a residual heat shrinkage capacity which can serve to heal slight deformations present in the carrier foil before the bonding occurs at final bonding. Preferably, process steps (c) and (f) are carried out such that the residual heat shrinkage capacity of the biaxially stretched carrier foil is still at least about 10%, preferably at least about 20%, of the original heat shrinkage capacity provided by the biaxial stretching and thermal fixing.

An adhesion of biaxially stretched PET carrier foils to the cover sheet formed from a glass pane can be avoided even without separating layers and thus in a cost effective manner, when the temperature in process step (c) is at least about 50° below the typical final bonding temperature of approximately 125° C. and thus about 75° C. In this case, the matching deformation of the carrier foil which is destined to the biaxial stretching at high temperatures is carried out in process step (c) with a still noticeable elastic volume proportion so that only upon process step (f) or on final bonding (process step (g)) does the final plastic deformation of the carrier foil occur which can give rise in extreme cases to a slight wrinkle formation or a slightly enhanced orange skin effect. It has thus been found to be advantageous for the production of laminated safety glass in the dimensions suitable for use in motor vehicles to operate with lower temperatures in process step (c) and thus without an additional separating layer in a wrinkle free manner. Panes with a transverse bend of more than 14 mm, by contrast, are preferably subjected to higher temperatures with the use of a separating layer in process step (c).

The process step (f) is effected in a heat treating furnace or an autoclave, preferably at a pressure of a maximum of 2.5 bar and a temperature which is at least 10° C. below the maximum used for final bonding according to process step (g). The final bonding according to process step (g) is effected in particular at a temperature of about 115 to 135° C. and a pressure of a maximum of 13 bar. In the prebonding processes of process steps (c) and (f), it has been found to be especially advantageous to employ the lip-seal prebonding process known from laminated glass fabrication, in which a lip-seal strip extends around the perimeter of the edges of the glass-foil-cover sheet stack or the glass-foil-glass stack and the latter is subjected to a subatmospheric pressure which sucks out the air from the interstices between the layers which have not yet been bonded together and wherein these layers are prebonded together with the aid of a heat treatment lasting about ½ to 1 hour. It is possible however, to also operate with other prebonding processes known per se, for example, using prebonding rollers or vacuum bags. For the final bonding of process step (g) the prebonded stack of glass panes, bonding layers and carrier foil is subjected to an autoclave treatment as is known per se from laminated glass fabrication.

BRIEF DESCRIPTION OF THE DRAWING

The above and other objects, features, and advantages will become more readily apparent from the following description, reference being made to the accompanying drawing in which.

SPECIFIC DESCRIPTION

EXAMPLE 1

Figure 1A:
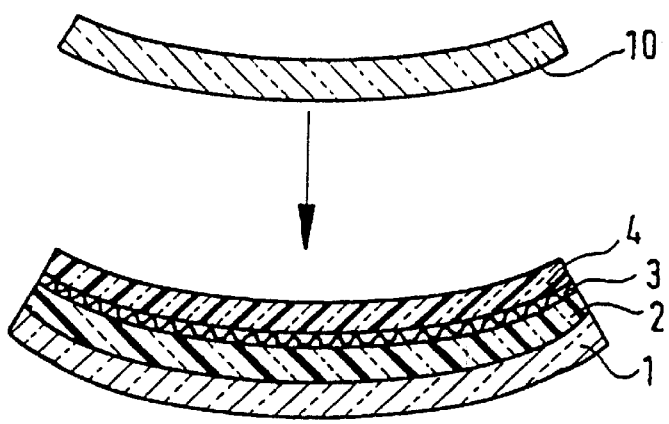
FIGS. 1a to 1e are diagrammatic sections illustrating in principle the important steps of the process of the invention according to a first embodiment as well as those process steps of the second embodiment which are in agreement with those of the first embodiment.

A 0.38 mm thick PVB bonding foil 2 which was embossed on both sides from the firm Monsanto and a PET carrier foil 4 with a solar control coating of high light permeability with a double silver coating (product designation XIR 75) of the firm Southwall forming a thin layer system 3 were are drawn from rolls and passed between a roll pair for degassing and partial bonding at about 60° to 80° C. with embedding of the thin layer system 3 between the PET carrier foil 4 and the PVB bonding foil 2 to form a prelaminate foil and then the latter was cut to matching dimensions.

The PET carrier foil 4 had been biaxially stretched and thermofixed before coating. The stretching and coating were carried out corresponding to PCT application EP 96/04018 (WO 97/10099) under such conditions that the PET carrier foil after the coating and before the production of the prelaminate foil had the following shrinkage characteristics: The coated PET carrier foil 4 shrinks over a 20 second submersion in a liquid bath heated to 120° C. of polyethyleneglycol (molecular weight about 400) in the foil plane parallel to and perpendicular to the longitudinal direction each by about 0.4%. The measurement of the shrinkage is effected so that between the jaws of a length measurement device both ends of a foil strip of a length of 150 mm and a width of 50 mm are clamped. The length of the foil strip is measured before immersion in the heated bath and after conclusion of the heat treatment at the same starting temperature. From this the length change is calculated as a measure of the degree of shrinkage at the predetermined shrinkage temperature and residence time.

The coated PET carrier foil had, for reliable adhesion to the PVB bonding foils 3, 5 on both sides, a surface energy of greater than 40 mJ/m$^2$. The foil prelaminate fabricated as described was applied wrinkle-free with its bonding side to a complexly bent first glass sheet mounted fixed to a horizontal support and having a thickness of 2.1 mm (process step (a)). The first glass sheet 1 of a length of about 1.50 m and a width of 0.90 m was bent in the longitudinal direction and also, in significantly reduced measure—in the transverse direction. Its height in the longitudinal direction was about 10 cm whereas its transverse bend amounted to 12 mm. It was provided along its edge over a 25 mm wide zone with a printed and baked on opaque masking side protective strip of ceramic color.

Figure 1B:
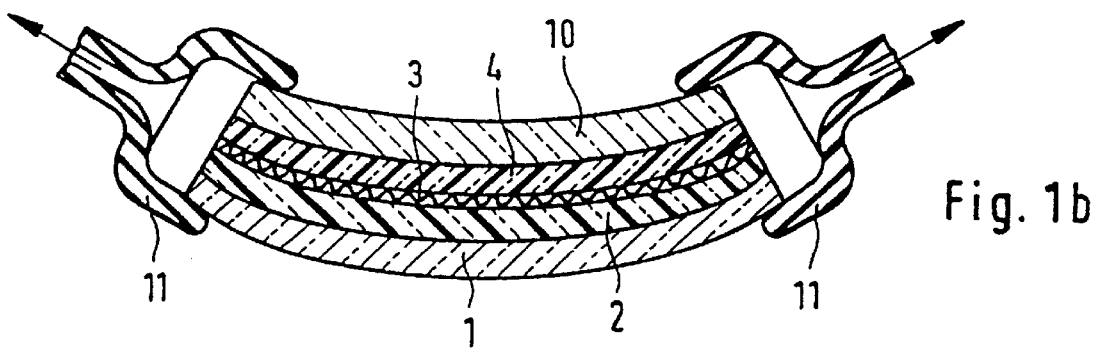

On the thus formed glass—foil stack, the second, 1.5 mm thick glass sheet of the laminated safety glass to be fabricated was applied as shown in FIG. 1a as a cover sheet, the second glass sheet having been previously bent together with the first glass sheet 1 in a gravity bending process (process step (b)). Around the edges of the glass-foil-cover layer stack, a vacuum lip-seal strip 11 was applied to degas the stack which was then degassed over a period of 20 min. (FIG. 1b). The stack, before application of suction, was heated in a heat treatment furnace to about 75° C., held at this temperature for about ½ hour and then cooled to room temperature (process step (c)). After removal of the cover layer (d) (process step (d)) it was noted that the PET carrier foil 4 matched the shape of the first glass layer 1 without the formation of wrinkles.

Figure 1C:
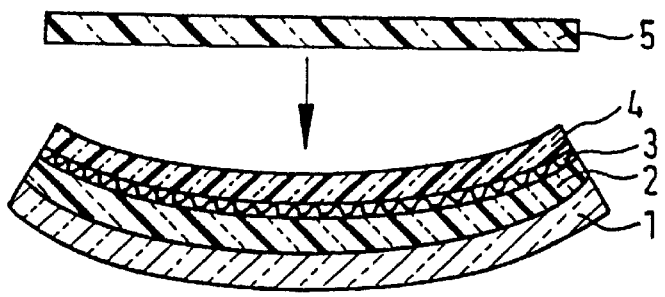
Figure 1D:
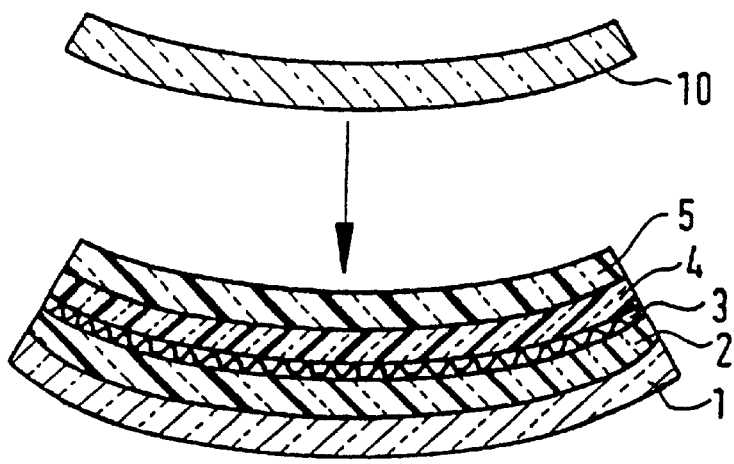

On the exposed uncoated side of the PET carrier foil 4 of the thus formed glass-foil prelaminate, as can be seen from the next steps illustrated in FIGS. 1c and 1d, a second 0.38 mm thick embossed PVB bonding foil 5 from Monsanto (FIG. 1c) was applied and on that the second glass sheet previously used as the cover layer was applied (FIG. 1d, process step (e)). The edges of the PVB bonding foils 2, 5 and the PET carrier foil 4 projecting beyond the edges of the glass sheets 1, 10 were cut off with a knife. Around the edges of the stack as described in the prebonding process, a lip strip 11 subjected to a suction system is provided for degassing.

Figure 1E:
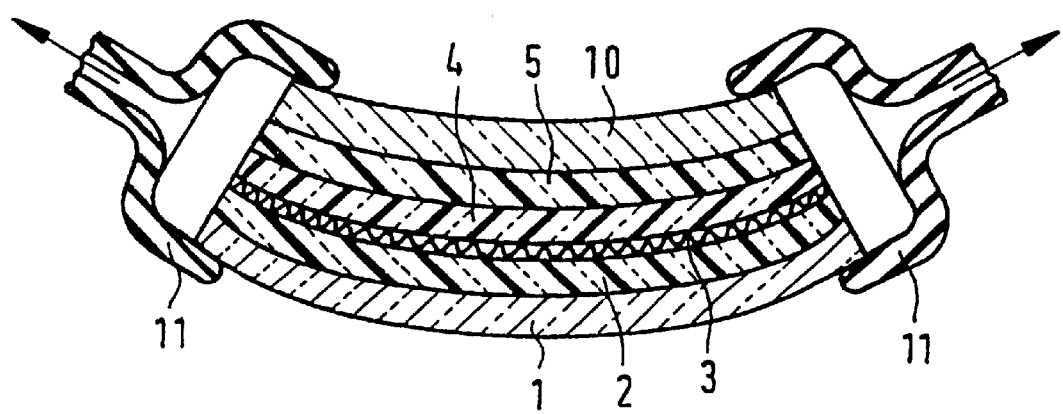

In the subsequent degassing process, the sealing strip was subjected to suction for a period of 20 minutes and the glass-foil-glass stack was degassed (FIG. 1e). Then, while the suction was maintained, it was subjected in a heat treating furnace to a ½ hour heat treatment at a maximum temperature of about 100° C. for prebonding (process step (f)). After intervening cooling the final bonding process followed after in an autoclave in which the prebonded glass-foil-glass stack was heated to about 125° C. and subjected to pressure at up to 13 bar (process step (g)).

The finished laminated safety glass sheet was subjected to an evaluation of the reflection and transmission optical properties after removal from the autoclave. Within the edge region of the pane covered by the masking strip, a slight undulation of the PET carrier foil could be detected. In the sight region which was not covered by the strip, however, the PET carrier foil 4 was seen to be wrinkle free. It had only a very slight orange skin effect barely detectable with the naked eye. The glass pane satisfied the stringent requirements for front or rear windows of motor vehicles with respect to safety characteristics and reflection and transmission optical properties.

EXAMPLE 2

Corresponding to Example 1, initially a foil prelaminate was fabricated from a 0.38 mm thick PVB bonding foil 2 embossed on both sides and a PET carrier foil 4 having a high light permeability solar control coating as a thin layer system.

Figure 2A:
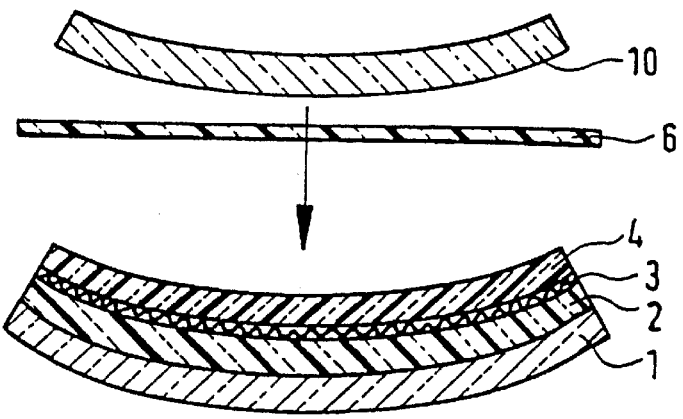
FIGS. 2a to 2c are cross-sectional views which illustrate the significant steps of the process of the invention according to the second embodiment.
Figure 2B:
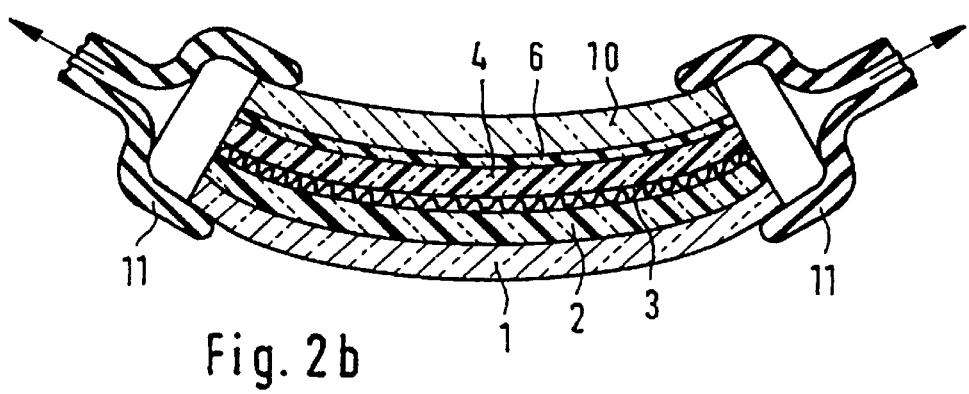

The foil prelaminate was deposited with its bonding foil side fold free on the concave side of a complexly bent first glass sheet 2 having a thickness of 2.1 mm and fixed on a horizontal support (process step (a)). The first glass layer 1 had the same dimensions of that of Example 1 and was bent both in the longitudinal direction and in the transverse direction. Its height in the longitudinal direction like that of Example 1 was about 10 cm while its transverse bend amounted to 15 mm. The foil prelaminate was provided along its edge with a 25 mm wide printed and baked-on opaque masking sight protective strip (not shown). Different from Example 1, together with the foil prelaminate an about 25 µm thick uncoated PET separating foil 6 was laid down on its carrier foil side as a separating layer for the process step (c). On the thus formed glass-foil stack, a second 1.5 mm thick glass sheet 10 was placed as a cover sheet, the glass sheet having previously been bent together with the first glass sheet 1 in a matching bending step by the gravity bending process (FIG. 2a, process step (b)). Around the edges of the glass-foil-cover sheet stack, a vacuum lip-seal strip 11 was placed for degassing and the stack was then degassed for a period of about 20 min (FIG. 2b). The stack to which the suction was applied was heated in a heat treating furnace to about 115° C. over a period of 30 minutes and then cooled to room temperature (process step (c)). After removal of the cover sheet 10 (process step (d)) and the PET separating foil 6 it was observed that the PET carrier foil (4) was free from wrinkles and matched the shape of the first glass sheet 1.

Figure 2C:
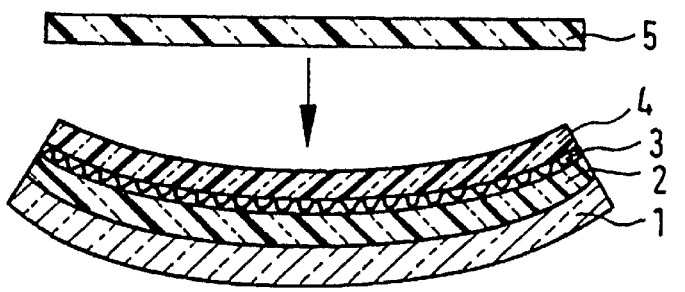

On the exposed uncoated side of the PET carrier foil 4 of the thus formed glass-foil prelaminate, in the next step, initially a second 0.76 mm thick embossed PVB bonding foil 5 with a glare prevention color wedge of the firm Monsanto (FIG. 2c) and a second glass sheet 10 which had previously been used as the cover sheet, from which the PET separating foil had been removed, were placed (FIG. 1c and 1d, process step (e)). The edges of the PVB bonding foils 2, 5 and the PET carrier foil 4 projecting over the edges of the glass sheets were cut off with a knife. Around the glass sheet edges, like in the first prebonding process, a lip-seal strip 11 connected to a suction system has applied for the purpose of degassing (FIG. 1e).

In the subsequent degassing process, the lip-seal strip 11 was subjected to suction for about 20 minutes and the glass-foil-glass stack was thereby degassed. Then, while the suction was maintained, it was heated in a heat treatment furnace in a heat treatment operation that lasted about ½ hour at a maximum temperature of about 100° C. (process step (f)). After an intervening cooling down, the stack was subjected to the final bonding process in an autoclave at which the prebonded glass- foil-glass stack was heated to about 125° C. and subjected to a pressure of up to 13 bar (process step (g)).

The finished laminated safety glass pane was subjected to an evaluation as to its reflection and transmission optical properties after removal from the autoclave. In the total sight region, the coated PET carrier foil 4 was found to be wrinkle free. In addition, practically no orange skin effect was observable. Overall the glass pane satisfied the stringent requirements for front or rear window panes of motor vehicles with respect to safety characteristics and reflection and transmission optical properties.

Comparative Example

A laminated safety glass pane with the same dimensions and the same components as in Example 1 was fabricated in that essentially as in example 1 a degassed and prebonded prelaminate was produced from a first bonding foil 2 and a coated PET carrier foil 4. The thus formed prelaminate was placed with its bonding layer side on a first glass sheet 1. On the prelaminate a second 0.38 mm thick PVB bonding foil 5 of the Monsanto firm was placed. The glass foil stack was completed by the conformingly bent second glass sheet 10, degassed and prebonded analogously to process step (f) according to claim 1 and thereafter finally bonded corresponding to process step (g). After the prebonding process it was noted that along the edge regions, a row of wrinkles were formed in the PET carrier foil and extended into the sight region of the window. These wrinkles did not heal during the final bonding process and thus interfered with the optical quality of the laminated safety glass pane which was produced and rendered it unsuitable for motor vehicle windows. The laminated safety glass pane according to Example 2 and the comparative example were subjected to measurements of the refractive power in reflection in the visible range. The measurements were carried out such that the reflection at the back side of the pane of screened out so that only the relatively large refractive power in reflection arising from the coated PET carrier foil was measured from the front side of the glass together with the relatively small refractive power in reflection at the front side of the glass which had a value of several millidiopters. The measurements give the following results:

|  | Mean Reflective Power | Maximum Value | Standard Deviation |
| --- | --- | --- | --- |
| Comparative Example | 50.4 | 281.7 | 42.4 |
| Example 2 | 15.5 | 82 | 13.1 |

It will be self understood that the measurement of the comparative example pane utilized only the wrinkle free regions of the pane to insure comparability of the measurements. The measurement results indicate that with the fabrication process of the invention, it is not only possible to avoid detrimental wrinkles formation in the carrier foil but also that the reflection properties of the panes, by contrast with the state of the art, show a reduction in the orange skin effect by more than 1/3 (seen in the measured values of refractive power in reflection) which represents a significant improvement. The use of the fabrication process of the invention enables the production of laminated safety glass panes with embedded coated carrier foils with hitherto unattainable qualities of the reflection optics.

What is claimed is:

1. A process for producing a bent laminated safety glass pane from a first bent glass sheet 1, a first bonding layer 2, a thermoplastic carrier foil 4 provided with a thin layer system 3, a second bonding layer and a second bent glass sheet matching the first bent sheet, comprising the steps of:

(a) placing a foil prelaminate, comprised of the first bonding layer and the carrier foil with a bonding layer side against the first glass sheet, (b) placing a cover sheet bent to match the first glass sheet, on the foil prelaminate, (c) degassing the glass-foil stack formed from the first glass sheet and the foil prelaminate and prebonding the stack under heat and pressure, (d) removing the cover sheet, (e) applying the second bonding layer and the second glass sheet to the prebonded glass-foil stack, (f) degassing the thus formed laminate and prebonding the laminate under heat and pressure, and (g) finally bonding the prebonded laminate by the application of pressure and heat to a laminated safety glass pane.

2. The process according to claim 1 wherein a biaxially stretched carrier foil is used.

3. The process according to claim 1 wherein a foil prelaminate is used in which the thin layer system of the carrier foil is in contact with the first bonding layer.

4. The process according to claim 1 wherein the second glass sheet is used as the cover sheet.

5. The process according to claim 1 wherein the cover sheet before application to the foil prelaminate is provided with an adhesion reducing thin separating layer.

6. The process according to claim 1 wherein the carrier foil of the foil laminate prior to the application of the cover layer is provided with an adhesion reducing thin separating layer.

7. The process according to claim 1 wherein as the separating layer, a separating foil is used which under the conditions of step (c) is adherent neither to the cover layer nor to the carrier foil.

8. The process according to claim 1 wherein the first and second bonding layers are comprised of polyvinylbutyral (PVB) or ethylenevinylacetate copolymers (EVA).

9. The process according to claim 1 wherein a carrier foil of PET (polvethyleneterephthalate) is used.

10. The process according to claim 2 wherein steps (c) and (f) are carried out at temperatures which are so far below the maximum temperature of the final bonding according to process step (g) that the heat shrinkage capacity of the carrier foil in both directions in process step (g) remains at least 10% and preferably at least 20% of its heat shrinkage capacity before process step (a).

11. The process according to claim 1 wherein for process step (c) a pressure of a maximum of 2.5 bar is used at a temperature which is at least 10° and preferably at least 50° below the maximum temperature at the final bonding according to process step (g).

12. The process according to claim 1 wherein step (f) is carried out at a pressure of a maximum of 2.5 bars and a temperature which lies at least 10° below the maximum temperature for final bonding according to process step (g).

13. The process according to claim 1 wherein the final bonding according to step (g) is carried out at a temperature of 115° to 135° C. and a pressure of a maximum of 13 bar.

* * * * *